Dec. 11, 1934.   F. P. ILLSLEY   1,983,543
SHUTTER OPERATING MECHANISM
Filed Sept. 28, 1931   10 Sheets-Sheet 1

Inventor:
Frank P. Illsley
By Brown, Jackson, Boettcher & Dienner
Attys.

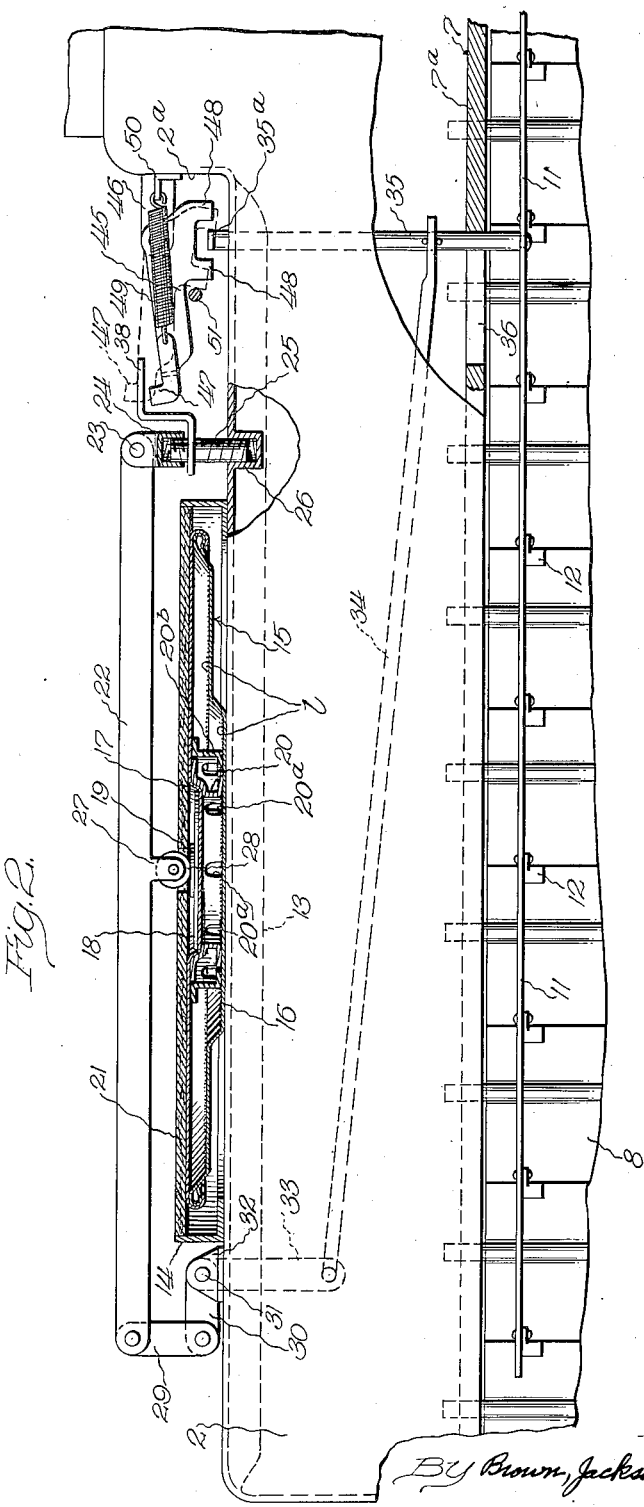

Dec. 11, 1934.  F. P. ILLSLEY  1,983,543
SHUTTER OPERATING MECHANISM
Filed Sept. 23, 1931  10 Sheets-Sheet 3
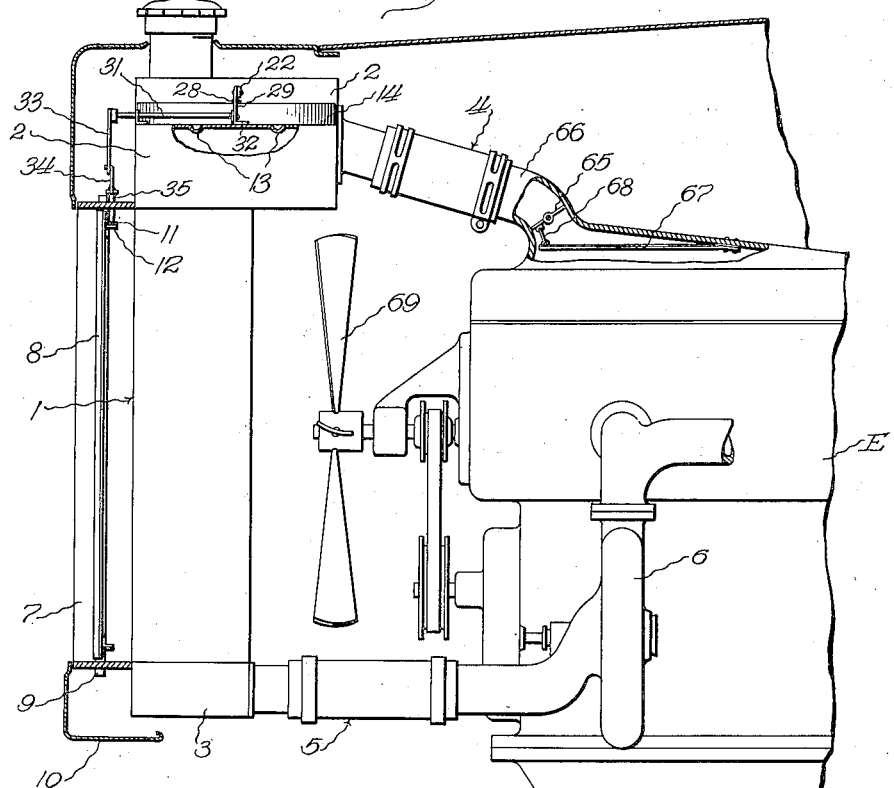
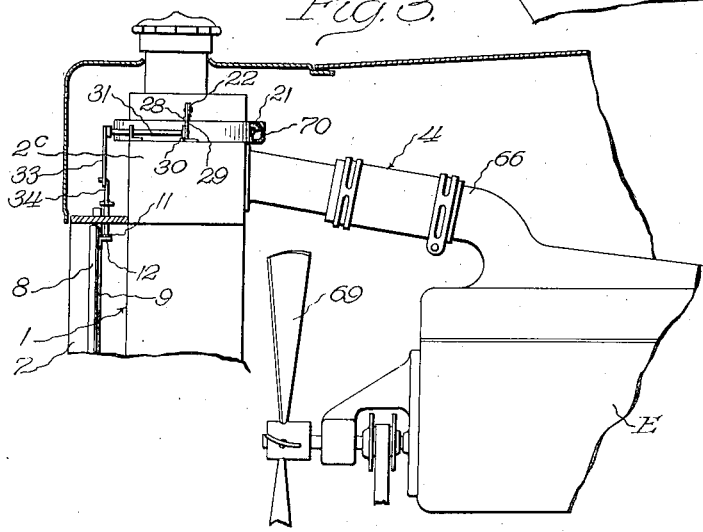
Inventor:
Frank P. Illsley
By Brown, Jackson, Boettcher & Diemer
Attys.

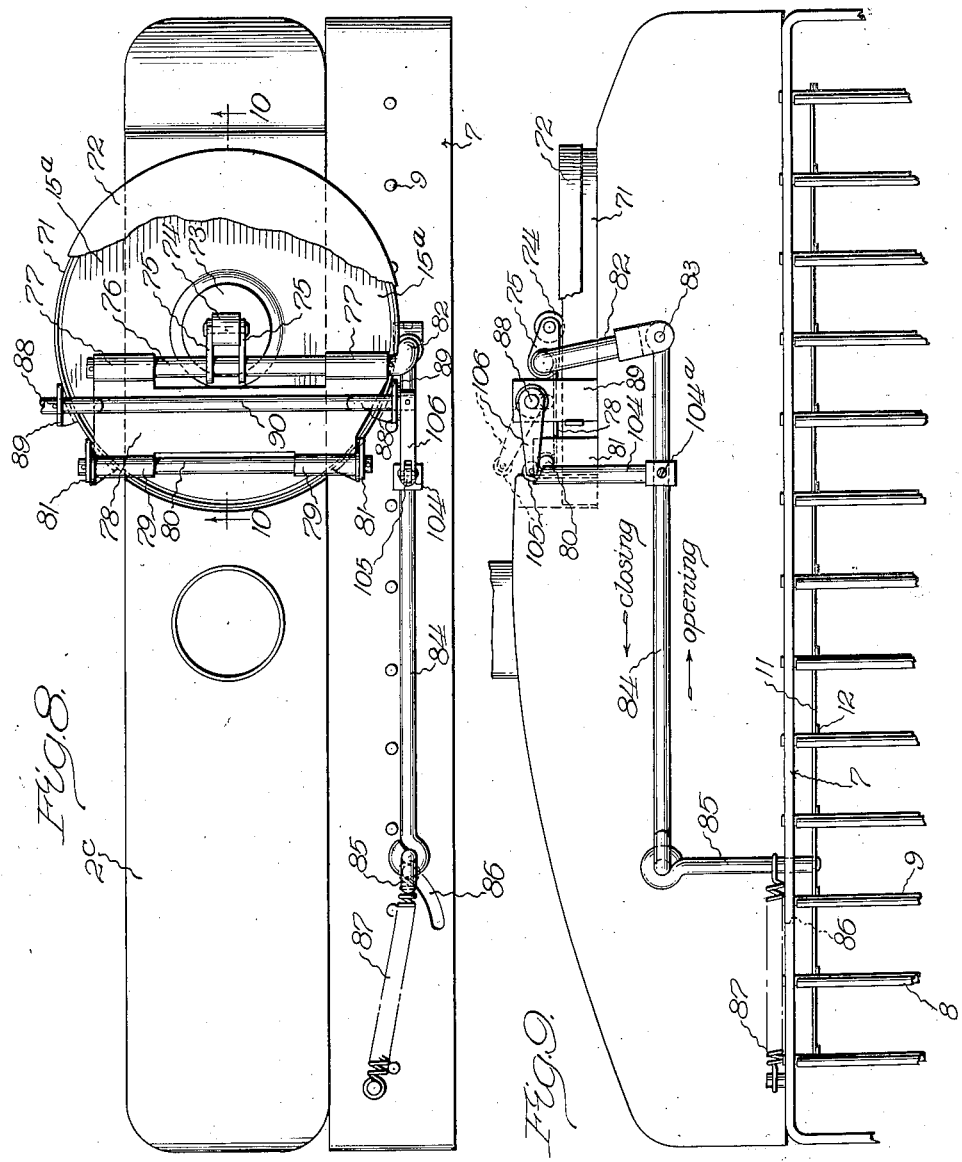

Dec. 11, 1934.　　F. P. ILLSLEY　　1,983,543
SHUTTER OPERATING MECHANISM
Filed Sept. 23, 1931　　10 Sheets-Sheet 5
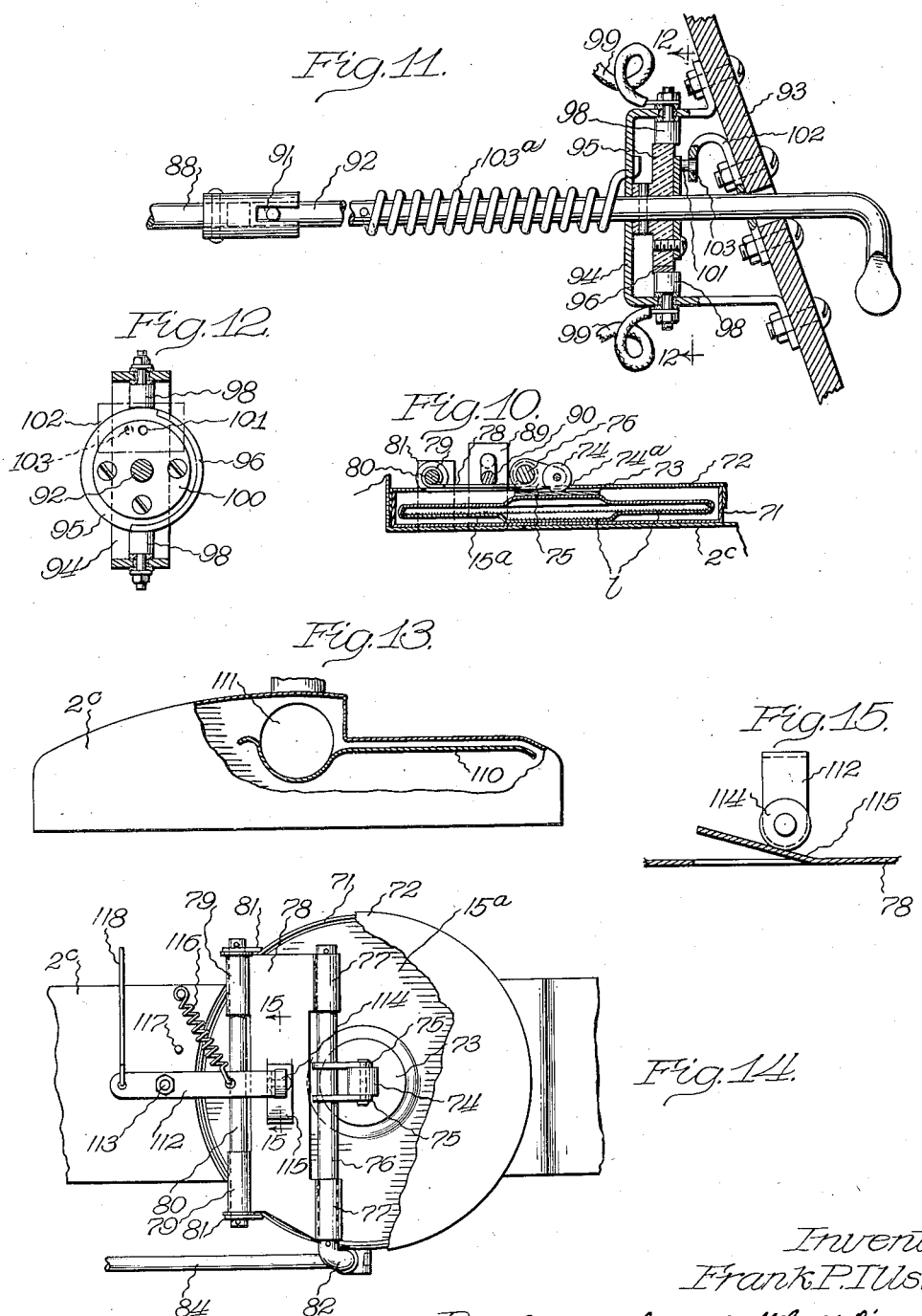

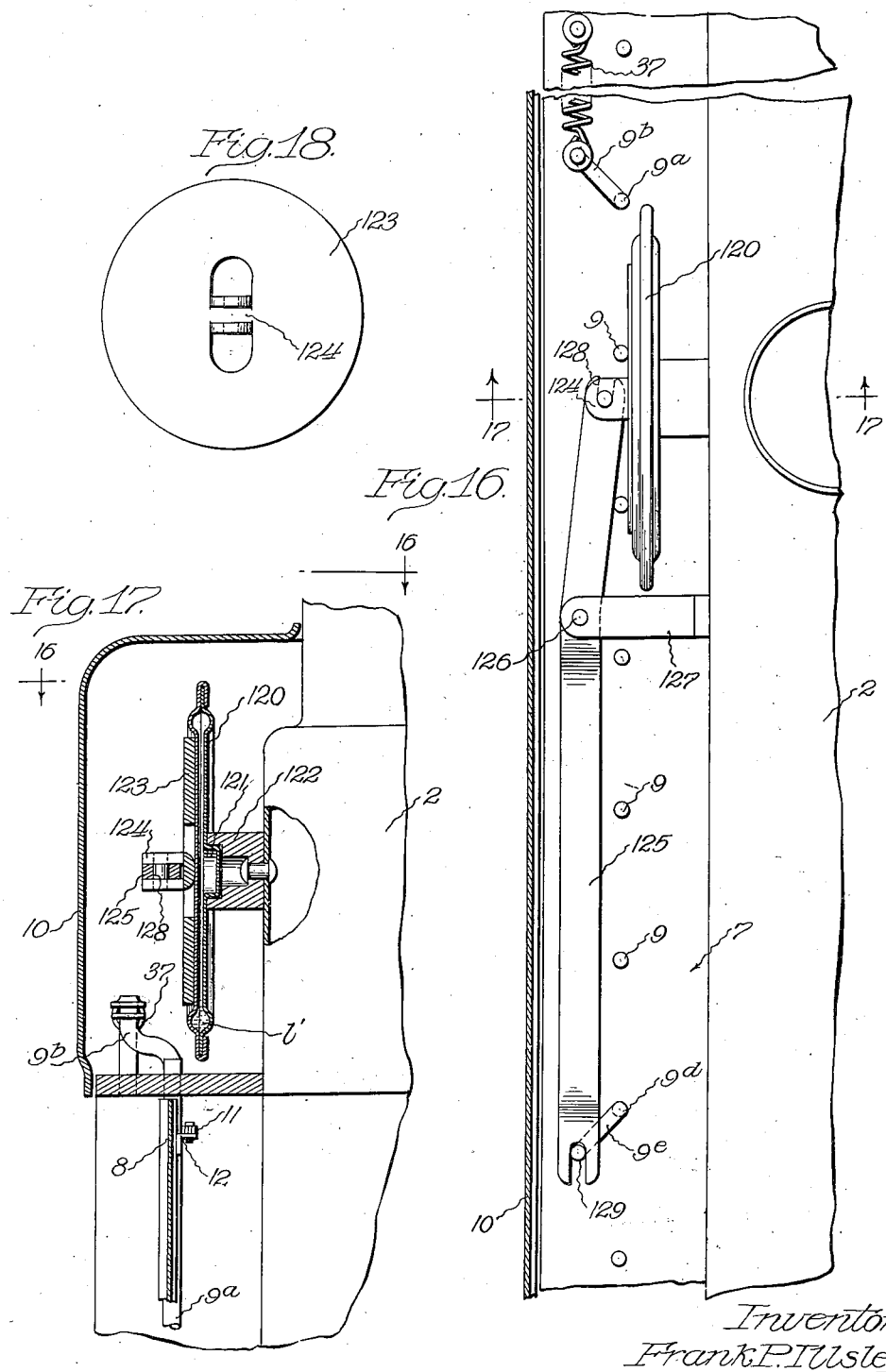

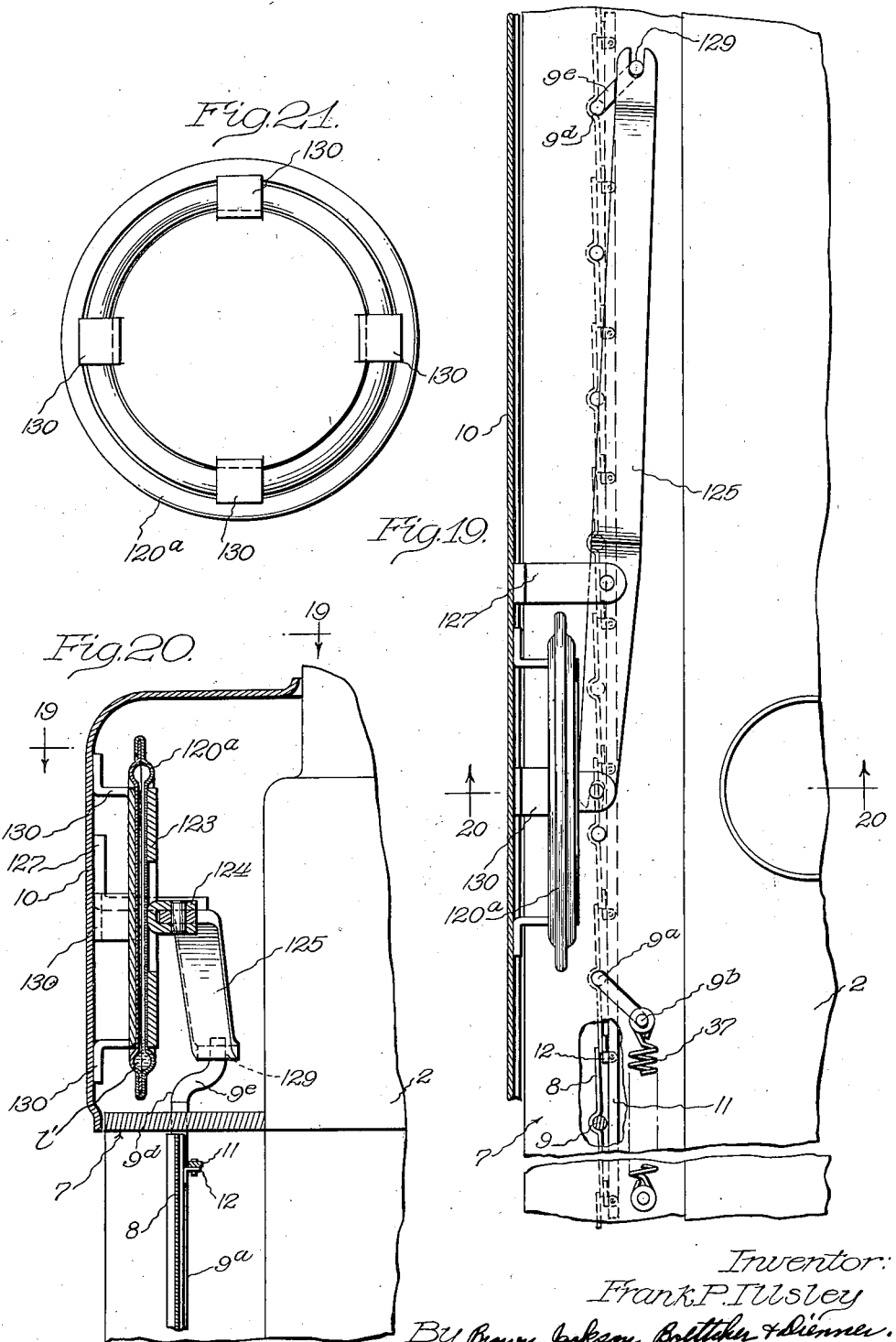

Dec. 11, 1934.  F. P. ILLSLEY  1,983,543
SHUTTER OPERATING MECHANISM
Filed Sept. 23, 1931  10 Sheets-Sheet 8
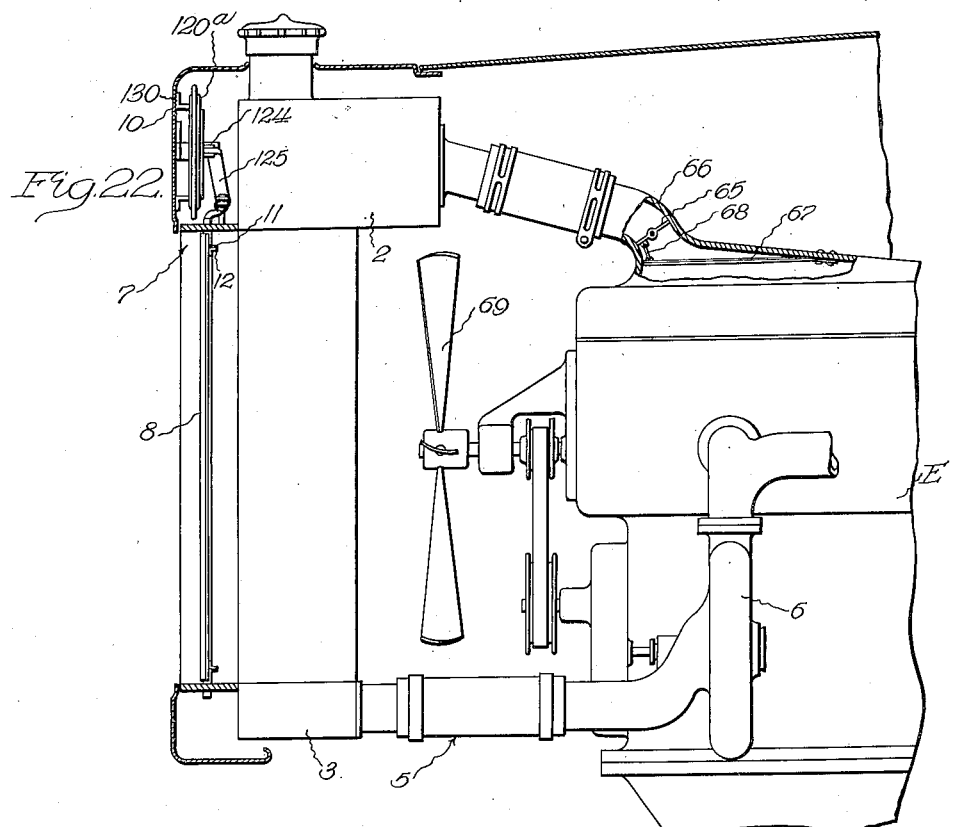
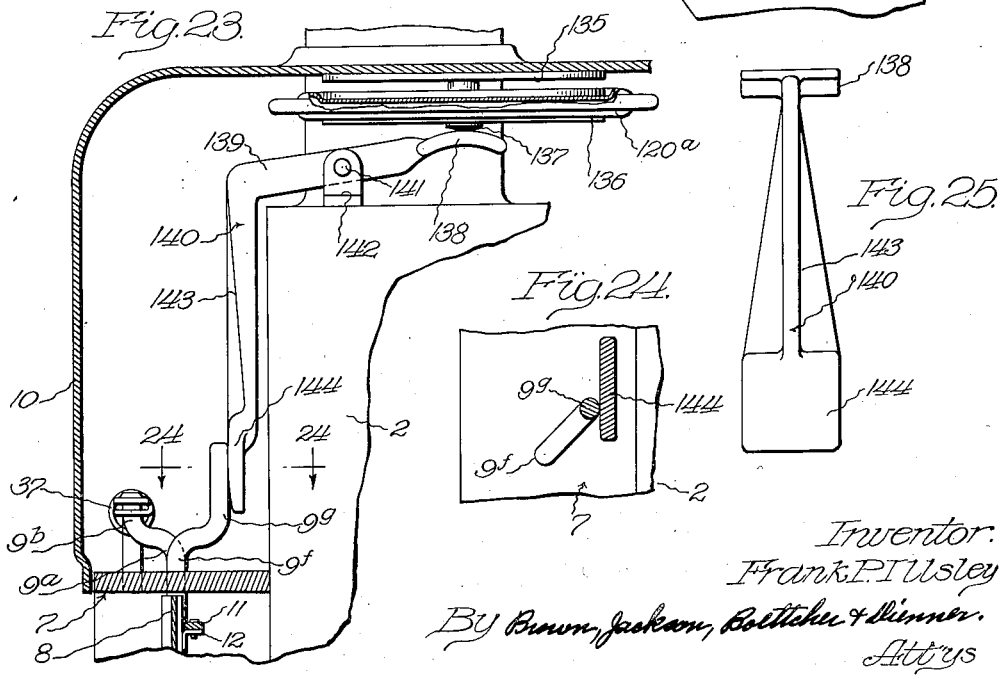
Inventor:
Frank P. Illsley
By Brown, Jackson, Boettcher & Dienner
Attys Dec. 11, 1934.  F. P. ILLSLEY  1,983,543
SHUTTER OPERATING MECHANISM
Filed Sept. 23, 1931   10 Sheets-Sheet 9
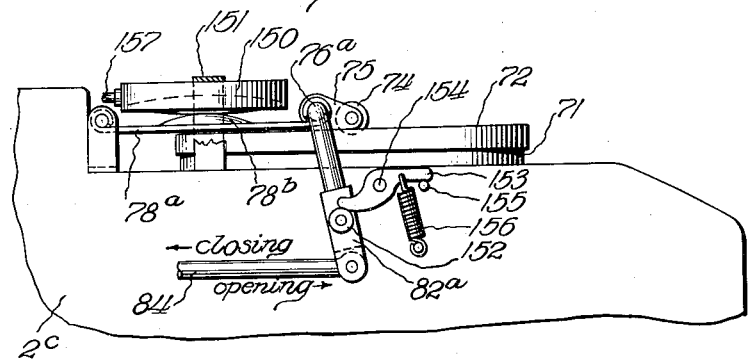
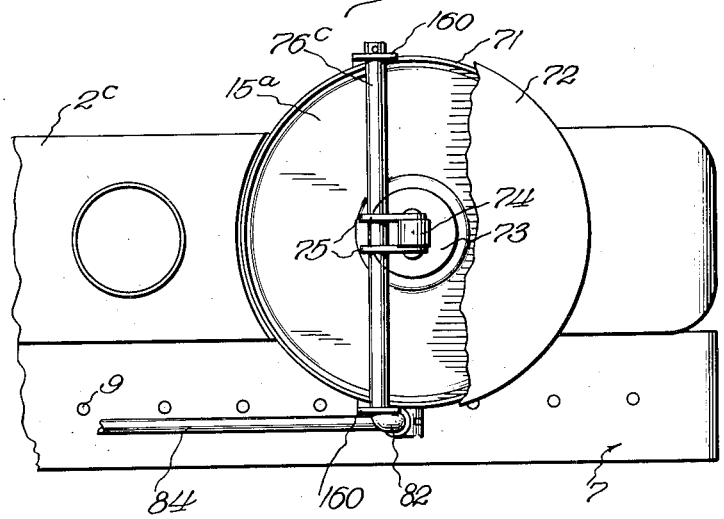

Dec. 11, 1934.　　　　F. P. ILLSLEY　　　　1,983,543
SHUTTER OPERATING MECHANISM
Filed Sept. 23, 1931　　10 Sheets-Sheet 10
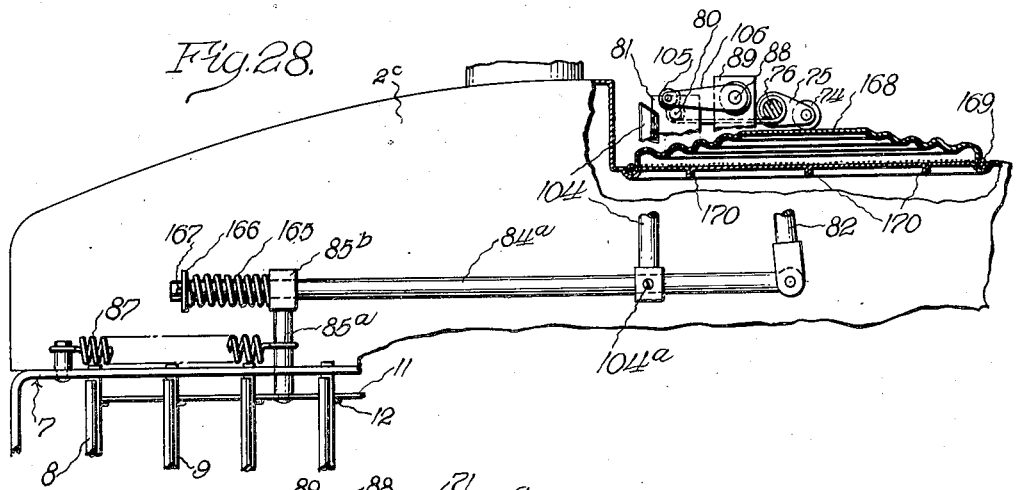
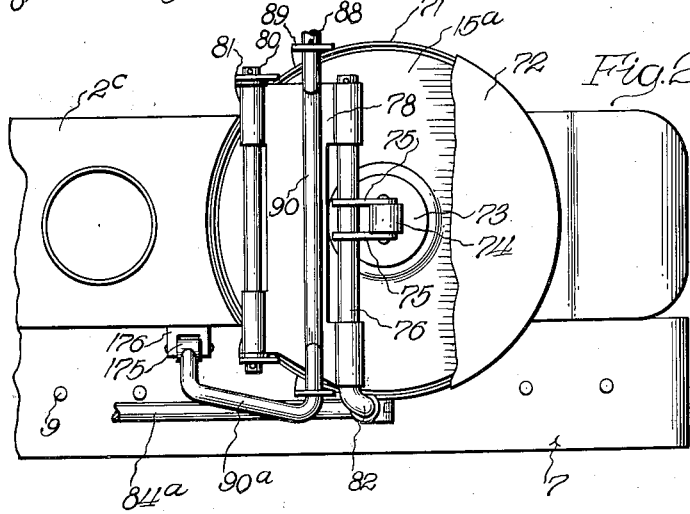
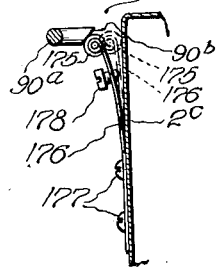
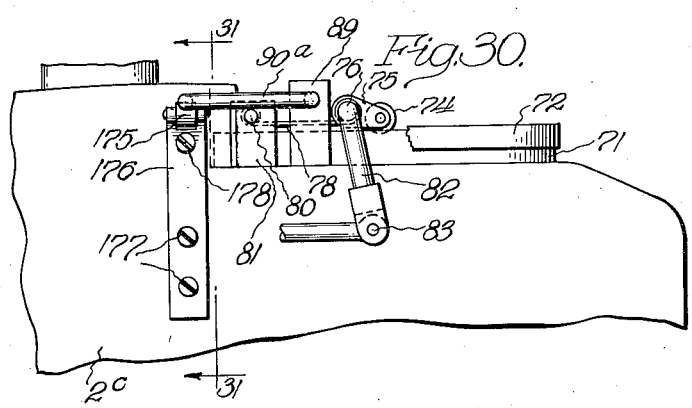
Inventor:
Frank P. Illsley
By Brown, Jackson, Boettcher & Dienner
Attys.

Patented Dec. 11, 1934

1,983,543

UNITED STATES PATENT OFFICE 1,983,543

SHUTTER OPERATING MECHANISM

Frank P. Illsley, Norton Township, Muskegon County, Mich.

Application September 28, 1931, Serial No. 565,497

19 Claims. (Cl. 236—35)

This invention relates to shutter operating mechanism, and more particularly to means for operating shutters for use with automobile radiators and analogous purposes.

It is known in the art to provide shutters for controlling the flow of air through the radiator, such shutters being operated by thermal means responsive to variations in temperature of the cooling water for opening the shutters in accordance with increase in temperature and permitting closing of the shutters in accordance with decrease in temperature. It is also known in the art to provide shutters which are opened by suction from the intake manifold of the engine, the effective suction being controlled by a thermally operated valve responsive to variations in engine temperature. An additional form of shutter operating means known in the art, is that in which closing of the shutters is controlled by engine suction in such manner that the shutters close as soon as the engine stops, regardless of the temperature of the cooling system or the cooling liquid therein.

In the first means above referred to, in which the shutters are opened and closed by and under the control of thermal means responsive to variations in temperature of the cooling water, no provision is made for controlling the operation of the shutters in accordance with weather conditions or variations in temperature of the atmosphere exterior to the engine.

During cold weather, the shutters may, and frequently do, remain open after the lower portions of the engine and the radiator have become chilled to an objectionable extent, resulting in congealing of the lubricating oil to such an extent as to render difficult starting of the engine, or freezing of the cooling liquid in the lower portion of the radiator, or both. This is due to the fact that the heat radiated from the cooling system rises and maintains the control thermostat, which is commonly disposed at the upper portion of the cooling system, at a sufficiently high temperature to hold the shutters open even though the lower portions of the radiator and engine may be at a much lower temperature.

In the last two systems above referred to, employing suction taken from the manifold for controlling the shutters, the shutters close immediately upon stoppage of the engine. This is highly objectionable because there is always a rise in temperature, after the engine has been stopped and the shutters closed, due to the residual heat radiated from the engine and the cooling system. In warm weather, this increase in temperature above the most efficient operating temperature for the engine, results in harmful overheating of the engine. In cold weather, on the other hand, the increase in temperature due to immediate closing of the shutters quickly raises the temperature of the cooling liquid to such an extent that the alcohol, or other volatile anti-freeze, commonly used, is caused to boil and escapes to atmosphere. Aside from the question of waste of the anti-freeze, the loss thereof greatly increases the likelihood of freezing of the cooling system. These objectionable conditions are aggravated when the engine stops in an overheated condition due to heavy pulling, which may occur in either warm or cold weather.

Present day shutter operating systems are, therefore, of two general types. In one type the shutters close under control of a thermostat in accordance with decrease in temperature at the upper portion of the cooling system, and may remain open for a very considerable time after stopping of the engine, with no provision for accelerating closing of the shutters. In the other type, the shutters close immediately upon stopping of the engine. Both of these systems are objectionable in the respects above pointed out.

So far as I am aware, in present day shutter operating means, inadequate provision is made for operating the shutters in such manner as to provide proper allowance for atmospheric conditions. My invention has to do particularly with means for eliminating the above noted objections to present day shutter operating systems by providing means for either accelerating or retarding closing of the shutters as conditions may require.

One of the main objects of my invention is to provide simple and efficient shutter operating means of the character referred to, such means having provision whereby the shutters may be closed and opened in such manner as to adequately provide for weather conditions and atmospheric temperature. A further object is to provide means whereby movement of the shutters in closing direction may be accelerated as conditions may require. It is also an object of my invention to provide thermo-responsive means for controlling closing and opening of the shutters, such means being so constructed and disposed as to be highly sensitive and respond readily to slight variations in temperature. Further objects and advantages of my invention will appear from the detailed description.

In the drawings:—

Figure 2 is a fragmentary back view of the top tank of the radiator and the shutter structure and associated parts, illustrating my invention as applied, part being shown in section and the radiator core being omitted for clearness of illustration;

Figure 3 is a side view of the radiator and the engine and associated parts illustrating my invention as applied to a narrow type of radiator tank;

Figure 4 is a side view of the radiator and engine and associated parts, partly in section, illustrating a modification of my invention;

Figure 5 is a fragmentary detail view illustrating a modification of shutter operating means;

Figure 7 is a fragmentary rear view of a V-type of radiator and associated shutter structure illustrating a third modification of my invention as applied thereto;

Figure 8 is a plan view of a radiator and a shutter structure applied thereto, illustrating a fourth modification of my invention;

Figure 9 is a fragmentary front view of the structure illustrated in Figure 8;

Figure 10 is a section through the thermostat and associated parts taken substantially on line 10—10 of Figure 8;

Figure 11 is a vertical sectional view through the ignition switch and associated parts used in the form of my device illustrated in Figures 8 and 9;

Figure 12 is a section taken substantially on line 12—12 of Figure 11;

Figure 13 is a fragmentary sectional view through the top tank of a radiator illustrating a fifth modification of my invention;

Figure 14 is a fragmentary plan view of a radiator and associated parts illustrating a sixth modification of my invention;

Figure 15 is a section taken substantially on line 15—15 of Figure 14;

Figure 16 is a fragmentary plan view, taken substantially on line 16—16, of Figure 17, of a radiator and associated shutter structure illustrating a seventh modification of my invention;

Figure 17 is a section taken substantially on line 17—17 of Figure 16;

Figure 18 is a detail outer face view of the pressure plate of the thermostat;

Figure 19 is a plan view of the radiator and associated shutter structure illustrating an eighth modification of my invention, this view being taken substantially on line 19—19 of Fig. 20;

Figure 20 is a section taken substantially on line 20—20 of Figure 19;

Figure 21 is an outer side view of the thermostat and the supporting structure therefor as shown in Figures 19 and 20;

Figure 22 is a side view of the engine and radiator and associated parts, part being shown in section, illustrating the form of my invention disclosed in Figure 19 and supplemental means for regulating the temperature of the cooling water;

Figure 23 is a fragmentary side view of a radiator and associated shutter structure, parts being shown in section, illustrating a ninth modification of my invention;

Figure 24 is a section taken substantially on line 24—24 of Figure 23;

Figure 25 is a detail front view of the angle lever shown in Figure 23;

Figure 26 is a front view of a tenth modified form of my invention;

Figure 27 is a plan view of an eleventh modified form of my invention;

Figure 28 is a front view, partly in section, of a twelfth modified form of my invention, as applied;

Figure 29 is a plan view of a thirteenth modified form of my invention;

Figure 30 is a front view of the form of Figure 29; and

Figure 31 is a section taken substantially on line 31—31 of Figure 30.

Figure 1:
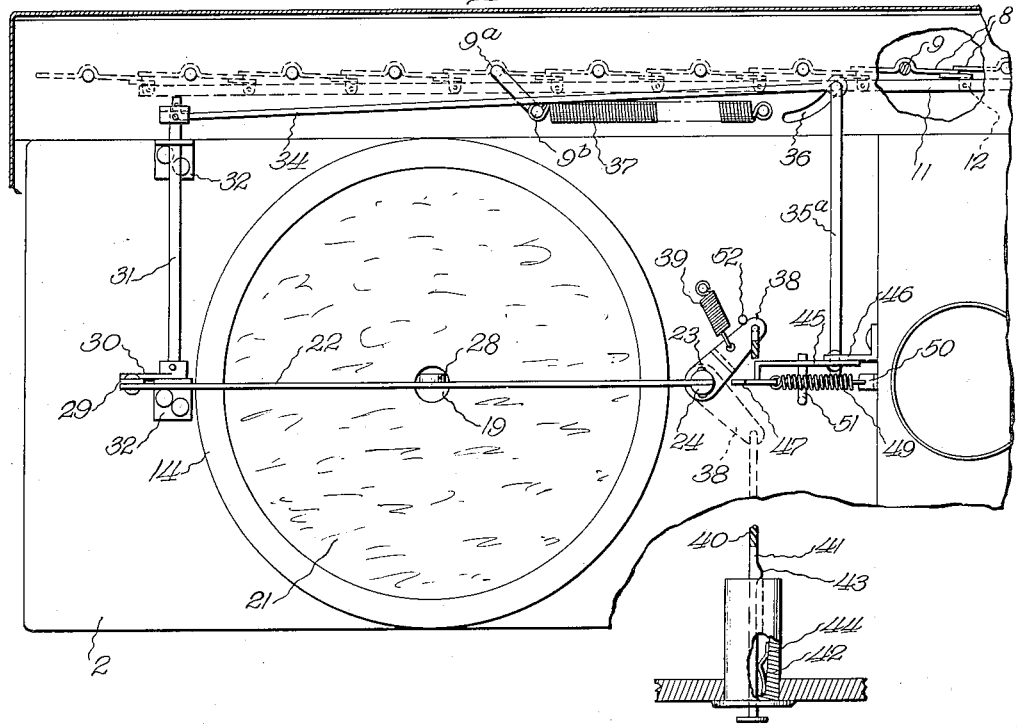
Figure 1 is a fragmentary plan view of a radiator and a shutter structure associated therewith, illustrating shutter operating means in accordance with my invention as applied.

In the form of my invention illustrated in Figures 1 to 4, inclusive, I have shown a radiator 1 of known type provided with upper and lower tanks 2 and 3, connected by suitable connections 4 and 5, respectively, to the water outlet and water inlet, respectively, of the cylinder jacket of engine E. A water circulating pump 6 is preferably provided in the connection 5, though this is not essential. A shutter structure, including a suitable frame 7 and shutters 8 pivotally mounted therein by pintle rods 9, is mounted adjacent the front of the radiator, this shutter structure being disposed within the outline of radiator shell 10. The shutters are connected by a drag link 11 pivoted to angle fingers 12 suitably secured to corresponding edges of the shutters, this link acting, when moved in one direction, to open the shutters, and when moved in the other direction, to close the shutters. The radiator and the shell therefor, and the shutter structure are, in general, of known construction and need not be described here in detail.

The top wall of tank 2 is preferably flattened at one side of the tank, as in Figure 2, and is provided with reenforcing corrugations 13. An annular holding member 14 of angle cross-section is suitably secured upon the flattened top wall of tank 2 and receives a thermostat 15 of what is termed the wafer type, this thermostat being in general of known construction and comprising a thin metallic shell containing a proper quantity of a suitable thermo sensitive liquid. Preferably the thermostat shell is provided with a flat under surface 16 of proper area to seat upon the top wall of the tank 2 in intimate contact therewith. The upper section of the thermostat shell is provided with a cup-like depression 17 within which is disposed a disc 18 carrying, on its upper surface, a concentric wear disc 19. The depression 17 is shaped to seat within a spool-shaped stop 20 disposed within the thermostat and positively limiting movement of the walls thereof so as to limit the extent to which the thermostat is collapsed. Preferably, though not necessarily, a layer or sheet of thermo insulating material 21 is cemented or otherwise suitably secured upon the upper face of the thermostat.

It is particularly pointed out that the thermostat is disposed exterior of the tank 2 and above the same in a dead air space between the tank and the radiator shell. Heat is readily radiated from the tank 2 to the upper portion of the radiator shell, and thence to atmosphere. As a result, the thermostat, thus disposed, is not directly responsive to variations in temperature of the cooling water but, on the contrary, is affected to an appreciable extent by the temperature of the atmosphere exterior of the radiator shell. Variations in atmospheric temperature have an appreciable effect upon the thermostat even though the thermal insulating member 21 be provided, and the effect of atmospheric temperature upon the thermostat is greatly increased if the layer 21 of insulating material be omitted, which may be done in certain cases. The provision or omission of the insulating layer 21 will depend upon the characteristics of the engine and radiator in connection with which the shutter operating means is used. There is a distinct advantage in having the thermostat disposed in a dead air space and subject to the influence of atmospheric temperature, in the manner above noted. In cold weather, the shutters will not open as quickly as if the thermostat were responsive solely to variations in temperature of the cooling water, which is advantageous when warming up the engine. Also, in cold weather, if the engine is stopped with the radiator shutters open, the thermostat will cool off much more quickly than would be the case if it were subject solely to the temperature of the cooling water, with the result that the shutters will close more quickly so as to retain the heat generated by operation of the engine for a much longer period than would be possible if the shutters remained open, which is advantageous. During warm weather, on the contrary, the shutters will, in general, close and open at a rate proportionate to atmospheric temperature. I thus obtain, by disposing the thermostat in the manner set forth, control of the shutters in accordance with atmospheric temperature with the advantages above noted. This I believe to be new in the art and consider an important feature of my invention.

An operating lever 22 extends above and diametrically of the thermostat 15. This lever is pivoted at one end, at 23, to an interiorly threaded socket member 24. This member receives one end of a screw stud 25, the other end of which screws into a socket 26 depending from the top wall of tank 2. The ends of the screw stud 25 are oppositely threaded, the threads being of steep pitch such that slight rotary movement of stud 25 in either direction effects material vertical movement of member 24 and the end of the lever 22 pivoted thereto. A bifurcated finger 27 depends from the central portion of the lever and carries a roller 28 mounted therein, this roller contacting the wear disc 19. The other end of lever 22 is connected by a link 29 to an arm 30 secured upon the rearward end of a shaft 31 rockably mounted in brackets 32 suitably secured to the top wall of tank 2. An arm 33 is secured to and depends from the forward end of shaft 31. The lower end of this arm is connected by a pull rod 34 to the vertical shank of an L-shaped trip member 35, the lower end of which is suitably secured to drag link 11, this member 35 operating through a slot 36 in the top bar 7a of shutter frame 7. Conveniently, one of the shutter pintles, designated 9a, is extended and shaped to form a crank element 9b disposed above the top bar 7a of frame 7. A tension spring 37 has one end suitably attached to the crank element 9b, the other end of this spring being secured to the shutter frame. The spring 37 yieldingly urges the shutters in closing direction, through movement of the pintle to which this spring is connected and the inter-connection of the shutters through the drag link. As will be noted more clearly from Fig. 1, the slot 36 is of arcuate shape to accommodate movement of member 35 with the drag link 11.

An adjusting arm 38 of approximately Z-shape is suitably secured to screw stud 25 and projects substantially therefrom. This arm is urged in a counter-clockwise direction, as viewed in Figure 1, by a tension spring 39 attached at its rearward end to the arm and having its forward end suitably anchored to the tank 2. The threads at the ends of the screw stud 25 are so disposed and related that upon turning movement of the arm 38 in a clockwise direction into the dotted line position of Figure 1, with similar turning movement of stud 25, the fulcrum 23 of lever 22 is lowered, tending to open the shutters, without, however, actually causing opening thereof. Suitable means is provided for moving arm 38 into the dotted line position of Figure 1, such as a flexible cord or cable 40 secured at its forward end to arm 38, the rearward end of this cable being secured to a rod 41 slidable through a latch structure 42. This rod is provided with a latch element 43 which cooperates with a spring catch 44 within the structure 42 for holding the rod in its rearward or retracted position. The latch means shown is merely illustrative of one possible means suitable for this purpose, and any other suitable or preferred means for moving the arm 38 into its rearward position and releasably holding it in such position may be employed.

A detent member 45 is pivotally mounted upon a bracket 46 suitably secured to vertical wall 2a of tank 2. This member 45 is provided with an upwardly projecting stop element 47, at the end thereof adjacent arm 38, and with two depending trip fingers 48 adjacent its other end. Trip member 35 is provided with a trip arm 35a which projects rearwardly over the tank 2 and is disposed to contact the trip fingers 48 in the opening and closing movement of the shutter. A tension spring 49 has one end attached to the stop element 47, the other end of this spring being attached to a bracket 50 secured to wall 2a of the tank. This spring 49 is disposed to move the detent member 45 into either its operative or inoperative position with a snap action as the end of the spring attached to the element 47 moves above or below the horizontal plane of the axis of movement of member 45, in a known manner. Movement of member 45 in either direction is limited by a suitably disposed stop element 51 conveniently secured to the top wall of the tank.

When the shutters are closed, the trip member 35 and the member 45 occupy the positions illustrated in full lines in Fig. 2. The rod 41 is pulled rearwardly so as to move the arm 38 into the dotted line position of Figure 1, when starting the engine. Arm 38 remains in the dotted line position of Figure 1 so long as the engine is in operation. After the engine has been warmed up, the thermostat acts to open the shutters more or less, and predetermined movement of the drag link 11 in shutter opening direction causes arm 35a of trip member 35 to contact the left-hand finger 48, as viewed in Figure 2, of member 45, thus turning this member in a clockwise direction sufficiently to raise the outer end of spring 49 above center, after which member 45 is moved into the dotted line position of Figure 2 with a snap action. This disposes element 47 in front of and adjacent arm 38 which is thereby held against forward movement. When the engine is stopped, rod 41 is pushed in, thus providing sufficient slack in the cable 40 to permit of arm 38 moving into its full forward position. This arm, however, is still held against forward movement by element 47. As the cooling system and the cooling liquid therein decrease in temperature, the thermostat collapses and permits of closing movement of the shutters. When the shutters have been closed to a predetermined extent, trip arm 35a contacts the right-hand finger 48, as viewed in Figure 2, swinging member 45 about its pivot in a counterclockwise direction, this movement of this member being completed by spring 49 so as to move the stop element 47 out of the path of movement of arm 38. This arm is then moved into its forward position by spring 39, thus raising the fulcrum of lever 22 a sufficient distance to permit of immediate and complete closing of the shutters. This assures that the shutters will be closed when the cooling liquid of the cooling system is at a temperature appreciably higher than that at which the shutters are closed by the thermostat when arm 38 remains in its forward position, but lower than the desired maximum operating temperature of the engine. This is advantageous in cold weather, since the engine is kept warmer for a much longer period of time than would be possible if the shutters closed at a rate corresponding to the rate of cooling of the thermostat during the entire closing movement of the shutters, while objectionable overheating of the engine is avoided. I thus provide mechanical means supplemental to the thermal responsive means and effective to accelerate closing of the shutters, the opening and the closing of the shutters, however, being at all times under the control of the thermo-responsive means when arm 38 is in its rearward position.

In order to assure proper closing of the shutters when arm 38 is released, I provide a stop for positively limiting expansion of the thermostat. As shown in Fig. 2, a stop member 20b is suitably secured to the under face of the top wall of the thermostat. This member extends about member 20 and is provided, at its lower end, with an inwardly projecting flange disposed to engage beneath the upper head of member 20 to limit movement of the walls of the thermostat away from each other. Upon release of arm 38, the adjacent end of lever 22 is moved upwardly, permitting of downward movement of the other end of the lever. This reduces the tension of spring 37, with the result that the load on the thermostat is diminished and the latter tends to expand further. This increased expansion of the thermostat is limited by the members 20 and 20b, as above stated, and the movement of lever 22, when arm 38 is released, is such that the shutters will be moved to full closed position even though the thermostat be expanded to its fullest extent.

In the form of Figure 1, if the spring 37 be of proper length and strength to maintain the load on the thermostat substantially constant at all times, there will be no appreciable expansion of the thermostat when arm 38 is moved into its forward position. Consequently, roller 28 will remain in bearing contact with the thermostat and, with arm 38 in its forward position, the lever 22 will be operated by the thermostat for opening and closing the shutters in accordance with expansion and contraction of the thermostat, for warm weather operation. On the other hand, if arm 38 be moved into its rearward position, either before or after starting the motor, accelerated closing of the shutters, in the manner previously described, is obtained for cold weather operation. With the arm 38 in its forward position, the shutters may open at a slightly higher temperature than with the arm 38 in its rearward position, but the opening of the shutters will be controlled by the thermostat to maintain the cooling liquid at the proper temperature. In this modification the expansion stop for the thermostat is not essential and may be omitted if desired.

In the modified form of shutter operating means shown in Figure 5, the drag link 11a is provided with alternately and oppositely disposed rack elements 55 which engage pinions 56 suitably secured upon the shutter pintles 9. This drag link is operated in the manner above described for opening the shutters, and may be yieldingly urged in shutter-closing direction in a suitable manner, as by means of a tension spring or equivalent means. Preferably movement of the drag link 11a is cushioned by a dash pot including a suitably mounted cylinder 56a in which operates a piston 57 provided with a restricted air passage 58 therethrough, this piston being secured to one end of a rod 59 the other end of which is swiveled at 60 to link 11a.

Figure 6:
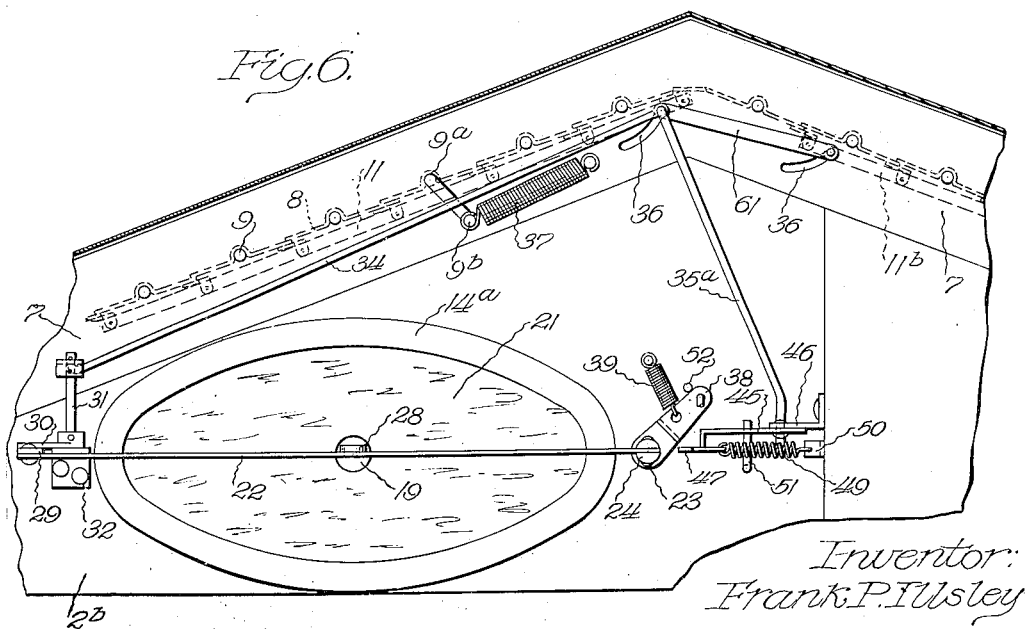
Figure 6 is a fragmentary plan view of a V-type of radiator and associated shutter structure illustrating a second modification of my invention as applied thereto.

In Figure 6 I have illustrated my invention as applied to a V-type of radiator. The shutter construction is formed in two sections each of which is constructed similarly to the shutter structure 7. One of the sections is operated by drag link 11 in the manner above described, this drag link 11 being suitably connected by a link 61 to a drag link 11b for operating the shutters of the other section. In all other respects, the operation and construction of the form of Figure 6 is similar to that of the form of Figure 1, with the exception that I may employ a thermostat of elliptical shape in plan view, due to the lateral taper of radiator tank 2b, this thermostat being disposed within a correspondingly shaped holding member 14a.

The form of Figure 7 is similar to that of Figure 6, except that two thermostats 14a are provided, connected by pull rods 34 to the respective sections of the shutter structure. These thermostats act to open the shutter sections and control closing thereof in the manner above set forth. The shutter sections in this form may operate independently or may be mechanically interconnected, as desired.

In the form of my invention illustrated in Figure 4, I have shown a valve 65 mounted in the water outlet connection 66 of the engine jacket for controlling flow of water therethrough. This valve is operated by a bimetallic thermostat strip 67 suitably secured at one end to the engine head, the other end of this strip being connected by a link 68 to the valve adjacent the periphery thereof. When the engine is cold, the valve 65 is closed and water does not flow through the connection 66. This is advantageous as facilitating warming up of the engine. After the engine has been warmed up the thermostat 67 operates to open the valve 65, after which this valve cooperates with the shutters for regulating the temperature of the liquid in the cooling system. It is particularly pointed out that valve 65 operates independently of the shutters and serves to regulate the temperature of the cooling liquid with much greater accuracy than is possible by the use of the shutters. When the shutters are open, either partially or completely, air is drawn through the radiator by fan 69 in a known manner. This cooling air flowing through the radiator serves to cool the liquid of the cooling system, which cooling action is modified or controlled to a considerable extent by the valve 65, this combined regulation of the cooling air and of the flow of the cooling liquid of the system, rendering possible more accurate control of the temperature of the cooling system than is obtained by the use of either of these devices separately.

It is the present practice in the construction of certain automobiles to have the top tank of the radiator of the same width as the radiator core. When my device is applied to a radiator of this type, I preferably provide a cup-like holder 70 for the thermostat, this holder being mounted upon the top of the upper radiator tank 2c and projecting forwardly and rearwardly thereof, as in Figure 3.

In the modified form illustrated in Figures 8 and 9, I have shown my invention as applied to a radiator having a narrow top tank 2c such as is shown in Figure 3. A cup-like casing comprising a lower section 71 and an upper section 72 fitting over and suitably secured to the lower section, is mounted upon the top wall of the tank, this casing being preferably formed of sheet metal. A thermostat 15a is disposed within the casing and is provided with a central flattened portion of appreciable area which seats upon the bottom of the casing. A wear disc 73 is secured upon the upper face of the thermostat, concentrically therewith for contact with a roller 74 projecting through an opening provided centrally of top section 72 of the casing. This top section limits the expansion of the thermostat beyond the point at which the shutters are fully open. Roller 74 is mounted between a pair of arms 75 secured to a shaft 76 which is rockably mounted in sleeve 77 provided at one edge of a plate 78. This plate is provided at its opposite edge, with sleeves 79 which loosely receive a pintle 80 mounted in brackets 81 suitably secured to the thermostat casing, this pintle being held against endwise movement. The plate 78 is thus mounted for rocking movement on the axis of pintle 80 and constitutes, with the shaft 76 and the arms 75 and roller 74, a toggle structure. The forward end of shaft 76 is bent downwardly to provide an arm 82 the lower end of which is pivotally connected at 83 to a pull rod 84 at one end thereof. The other end of this pull rod is connected to a stud 85 secured to drag link 11 of the shutter structure, this stud operating through an arcuate slot 86 in the top of the shutter frame. A tension spring 87 is connected at one end to the stud 85 and has its other end suitably secured to the shutter frame. This spring urges the drag link 11 in shutter closing direction.

A control rod 88 is rockably mounted in brackets 89 suitably secured to the thermostat casing, this rod being held against endwise movement through the bracket and the portion of the rod between these brackets being shaped to provide a crank element 90 which, in its lowered position bears upon plate 78 and holds it against upward movement. When this plate is held against upward movement, in this manner, arms 75 turn on the axis of shaft 76 and the shutters are under the control of the thermostat during their opening and closing movements.

The rearward end of rod 88 is connected by means of a pin and slot connection 91 (Fig. 11) to a switch rod 92 which is mounted for turning movement through an instrument board or panel 93. This rod extends through a bracket 94 of substantially U-shape suitably secured to the forward face of board 93. A disc 95 of electrical insulating material is pinned or otherwise suitably secured upon rod 92 for movement therewith. A contact strip 96 extends about a portion of the circumference of disc 95 and is disposed to be moved into contact with contact members 98 for establishing electrical connection therebetween, leads 99 being suitably connected to the members 98 for connecting the same into the ignition circuit. The members 98 are of known type and are yieldingly urged toward the disc 95 in a known manner.

A disc 100 is suitably secured upon the rearward face of the insulating disc 95, and carries a pin 101 disposed for engagement into a corresponding opening in a holding plate 102 suitably secured to the forward face of board 93. A tension spring 103a is coiled about rod 92, one end of this spring being secured through the rod and the rearward end of the spring being secured to the bracket 94. Spring 103a urges rod 92 rearwardly and also tends to turn this rod in a clockwise direction as considered in Fig. 12. Movement of the rod in a clockwise direction serves to move the contact strip 96 out of operative relation to one of the contacts 98, thus opening the ignition circuit. The pin and slot connection 91 between the rods 88 and 92 assures turning of rod 88 with rod 92 while permitting of relative endwise movement of the latter. When disc 95 is turned into circuit closing position, pin 101 engages into opening 103 of plate 102 so as to lock the disc in such position. To open the switch, rod 92 is pushed forwardly sufficiently to disengage pin 101 from the opening 103 and is then turned in a clockwise direction to move the pin out of alignment with the opening, after which the rod may be released, spring 103a completing the movement of the switch rod in switch opening direction. Turning movement of the rod in this direction is limited so that, when the switch rod is in its off position, pin 101 is in contact with the forward face of plate 102. To close the switch, the rod 92 is turned in the opposite direction until pin 101 is aligned with opening 103, at which time the rod will be moved rearwardly by spring 103 so as to cause the pin to engage into such opening and lock the rod against turning movement.

A stop finger 104 is adjustably secured to and projects upwardly from pull rod 84. The upper end of this finger is preferably inclined downwardly in the direction of the opening movement of rod 84 for contact with a roller 105 carried by an arm 106 secured upon the forward end of shaft 88. When the shutters are in full open position, finger 104 is disposed for contact by the roller 105, as in Figure 9. When the ignition switch is closed, arm 106 is raised away from the stop finger 104, as is shown in dotted lines in Figure 9. Upon turning movement of the switch rod 92 in switch opening direction, arm 106 is moved into the lowered position of Figure 9 and the roller 105 bears upon the inclined upper end of finger 104, this movement of arm 106 and rod 88 being sufficient to permit of opening of the ignition switch. As the temperature of the cooling system decreases, the shutters move in closing direction, causing movement of rod 84 and finger 104 toward the left as considered in Figure 9. During this movement, the action of spring 87 is supplemented by the action of spring 103a through rod 88 and arm 106 and roller 105. As soon as finger 104 passes out of contact with roller 105, arm 106 is swung downwardly by the action of spring 103a thus swinging the crank 90 of shaft 88 upwardly and releasing plate 78. This plate then swings upwardly in a counter-clockwise direction, as viewed in Figure 9, about the pintle 80, thus raising the shaft 76 and permitting of relatively downward movement of roller 74, this movement being sufficient to complete the closing movement of the shutters. In this manner, quick closing of the shutters, under control of the thermostat, is effected. This is particularly advantageous in cold weather. It is not necessary that the shutters be completely open to effect the quick closing thereof in the manner above described, since this result is obtainable throughout an appreciable range of movement of the shutters. In this form of my invention, as in the forms previously described, the thermostat is disposed in a dead air space, out of the path of flow of air through the radiator or about the engine, and is responsive to an appreciable extent to variations in atmospheric temperature. This indirectly adds also to the prompter closing of the shutters in cold weather, and to the operation of the shutters in a manner to compensate for variations in atmospheric temperatures.

Referring to Fig. 9, the finger 104 is adjustably secured to pull rod 84 in a suitable manner, as by means of a set screw 104a. This permits of ready adjustment of the finger to vary the temperature at which the accelerated closing of the shutters becomes effective.

It is not essential that the rod 92 of Figure 11 be employed for operating the ignition switch. Under certain conditions it may be desirable to have this rod independent of such switch. In such cases, the contact strip 96 and the contacts 98 would be omitted, the plate 102 and associated parts being utilized simply for holding the rod 92 in rotary adjustment. Under such conditions, rod 88 could be adjusted so as to hold the plate 78 against upward movement at all times during warm weather, and could be released to permit upward movement of plate 78, when the engine is stopped after being in operation for a sufficient length of time to cause opening, either partially or completely, of the shutters, in cold weather so as to obtain the benefit of quick closing of the shutters above referred to. The device constructed in this manner is selective, in that the shutters may close in accordance with the rate of cooling of the thermostat in warm weather, and closing of the shutters may be accelerated when desired, particularly in cold weather.

It may be desirable, under certain conditions, to have the thermostat respond more closely to the variations in temperature of the cooling liquid in some instances than in others, depending largely upon the characteristics of the engine with which the device is used. In Figure 13 I have shown a baffle 110 disposed to direct the hot water or solution entering tank 2c of the radiator through the inlet 111, into contact with the flattened portion of the top wall of the tank upon which the thermostat is mounted. While not necessary under ordinary conditions, I find the provision of this baffle of advantage in certain cases.

In the modified form illustrated in Figure 14, an arm 112 is pivotally mounted intermediate its ends at 113, and carries at its outer end a roller 114 disposed to contact a cam element 115 carried by plate 78. Conveniently, this cam element may be formed integrally with the plate by suitably slotting the same to provide a tongue which is then bent upwardly at an angle. Arm 112 is urged about pivot 113 in a counterclockwise direction, as viewed in Figure 14, by a tension spring 116 attached at one end to the arm and having its other end attached to tank 2c. Movement of the arm in this direction is limited by a stop 117 suitably secured to the tank. The other end of arm 112 has a cable 118 suitably attached thereto. This cable may be connected to suitable means, such as the latch means of Figure 1, for holding the arm 112 in position with the roller 114 in contact with cam element 115 thus holding the plate 78 depressed. Upon release of cable 118, tension spring 116 brings arm 112 into inoperative position, moving roller 114 out of contact with cam element 115 thus permitting upward movement of plate 78. This upward movement of plate 78 permits of increased closing movement of the shutters under control of the thermostat, thus accelerating closing of the shutters in the manner above set forth in connection with the form of my invention disclosed in Figures 8 and 9. In the form disclosed in Figure 14, the roller 114 is preferably disposed an appreciable distance above the plate 78, this distance being such that the plate can raise sufficiently to permit of closing of the shutters even though they be in full open position. Accordingly, when the cable 118 is released, the shutters are immediately closed, which is particularly advantageous in cold weather. On the other hand, with the cable secured in its rearward position, and roller 114 in contact with cam element 115, the shutters are actuated by the thermostat alone during both closing and opening movements for warm weather operation.

In Figures 16 and 17 I provide a wafer type of thermostat 120 disposed in the dead air space between the front wall of top tank 2 of the radiator and the upper portion of the radiator shell 10. The rearward wall of this thermostat is centrally depressed to provide a stud 121 which fits into a corresponding recess provided in the forward end of a supporting post 122 of heat insulating material, which post is riveted or otherwise suitably secured to the front wall of the tank. A pressure disc 123 is suitably mounted at the forward face of the thermostat and is provided with a U-shaped bracket 124 conveniently formed integrally with the disc. An operating lever 125 is pivoted intermediate its end, at 126, in a bracket 127 secured to the front wall of tank 2. One end of this lever has a pin and slot connection 128 to the bracket 124, and the other end of this lever has a pin and slot connection 129 with a crank 9e of pintle 9d of one of the shutters. The shutters are connected by the drag link 11 and are urged in closing direction by a tension spring 37 attached at one end to crank 9b of pintle 9a of one of the shutters, the other end of this spring being suitably anchored to the shutter frame. In this construction, the shutters are under the control of the thermostat 120 throughout their entire opening and closing movements, and this thermostat is responsive to the temperature in the dead air space within which it is positioned, this temperature being a resultant of atmospheric temperature and the heat radiated from tank 2. In this manner, the operation of the shutters is controlled to a material extent by atmospheric temperature and the shutters will open more quickly in warm weather than in cold weather, and will close more quickly in cold weather than in warm weather. I thus obtain an automatic regulation of the shutters which compensates for variations in atmospheric temperature.

In the form disclosed in Figures 19 and 20, a thermostat 120a is supported in the dead air space between the front wall of the tank and the upper portion of the radiator shell by means of a spider 130 suitably secured to the inner face of the shell, and lever 125 is pivoted in bracket 127 also secured to the shell. The construction and operation of this form of my invention is otherwise similar to that of Figures 16 and 17. It will be noted, however, that the thermostat 120a is disposed somewhat closer to the shell than the thermostat 120, and has metallic connection therewith. Consequently, in the form of Figures 19 and 20 the thermostat responds more directly to variations in atmospheric temperature than in the form of Figures 16 and 17.

In the modified form illustrated in Figure 22, the shutters are operated by the thermo-responsive means of Figures 19 and 20 and are supplemented by a valve controlling the water outlet connection 66 of the engine head, this valve being operated by a thermostat 67, as in Figure 4. The valve 65 and the shutters cooperate to control flow of cooling air through the radiator and to regulate the temperature of the cooling water as above set forth in connection with Figure 4.

In Figure 23, thermostat 120a is mounted upon the under face of the top wall of shell 10, by means of a spool-shaped supporting structure 135. A pressure plate 136 is mounted upon the under face of the thermostat and is provided with a central button 137 which contacts the upper surface of an arcuate head 138 provided at the rearward end of upper arm 139 of an angle lever 140, which arm 139 is pivoted intermediate its ends at 141 to a suitable bracket 142 secured to the top wall of tank 2. Arm 143 of lever 140 is provided, at its lower end, with a flattened foot 144 which contacts the upwardly extending element of a crank member 9g provided at the upper end of pintle 9f of one of the shutters 8. The shutters are yieldingly urged in closing direction by a tension spring 37 having one end anchored to the shutter frame and its other end connected to crank 9b of a pintle 9a of one of the shutters. When the thermostat 120a expands, arm 143 of lever 140 is moved forwardly and acts to open the shutters against the tension of spring 37. As the thermostat collapses, the spring closes the shutters in accordance with the upward movement of head 138 of lever 140. It will be noted that thermostat 120a, in Figure 23, is disposed in the dead air space between the top of tank 2 and the top of shell 10. This thermostat, disposed in this manner, is affected by the heat radiated from tank 2 to a somewhat greater extent than the thermostat of Figures 16 and 17 and 19 and 20. However, it is also affected to a material extent by atmospheric temperature so that the thermostat responds to the temperature which may be considered as the resultant between atmospheric temperature and the temperature of the cooling liquid in the tank 2. In the forms of my invention disclosed in Figures 16 to 25, inclusive, the thermo-sensitive fluids used in the thermostat, usually liquids, should have a somewhat lower boiling temperature than in the form in which the thermostat has more direct thermal connection to the radiator and derives more heat therefrom by conduction.

The modified form of Figure 26 is quite similar to that of Figure 8, except that rod 88 and finger 104, and associated parts of the form of the latter figure are omitted. Plate 78a is arched upwardly, at 78b for contact with the lower face of a flexible diaphragm member 150 supported by an inverted U-bracket 151 suitably secured to the thermostat casing. Member 150 is of known type, being formed of sheet metal and so constructed that the top and the bottom walls thereof move inwardly toward each other, by their inherent resiliency, upon release of pressure within such member. Devices of this character are known in the art and need not be illustrated nor described here in detail.

Roller 74 is carried by arms 75 secured to a shaft 76a, corresponding to shaft 76 of Figure 8, and bears upon disc 73 as in Figure 8. An arm 82a is secured to and depends from the forward end of shaft 76a. The lower end of this arm is connected to pull rod 84 which has operating connection to the shutters, as before.

A roller 152 is mounted upon arm 82a and is disposed to contact one arm of an angle lever 153 pivoted at 154. The other arm of this lever is normally held in contact with a stop member 155, by a tension spring 156. The interior of member 150 is connected to a suitable source of pressure, such as the outlet of the oil pump, or other suitable appurtenance to the engine, by a tube 157.

When the engine is in operation, the lower wall of diaphragm device 150 is maintained in its projected or distended position by the pressure within this device, and bears upon portion 78b of plate 78a so as to hold this plate against upward movement. Under such conditions, roller 74 turns about the axis of shaft 76a and turns the latter, under the influence of the thermostat, for opening the shutters and controlling closing thereof. The shutters are thus moved in opening and closing directions in accordance with variations in the temperature of the engine and the cooling system therefor during operation of the engine. At such time, the roller 152 moves with arm 82a through an arc such that the roller clears the arm of lever 153.

Upon stopping of the engine, the pressure within member 150 is released and the lower wall of this member then moves upwardly out of contact with plate 78a, so as to permit of upward movement of the latter. However, when the shutters are in their full open position, roller 152 is disposed beneath the arm of lever 153, as in Fig. 26. Under such conditions, the plate 78a is held against upward movement even though member 150 be fully collapsed. As the engine and the cooling system therefor cool, the thermostat contracts permitting movement of the shutters in closing direction. This causes movement of arm 82a in a clockwise direction, so as to move the roller from beneath lever 153 when the shutters have been closed to a predetermined extent, which occurs at a predetermined temperature of the engine and the associated cooling system. As soon as the roller passes out of contact with the arm of lever 153, the inner end of plate 78a is free to move upwardly under the influence of roller 74 bearing upon disc 73, and turning movement imparted to arm 82a by the shutter closing spring, through rod 84 and associated parts. This, in effect, breaks the toggle comprising plate 78a, shaft 76a and arms 75, and permits of turning movement of shaft 76a in proper direction and amount to complete closing of the shutters. In this manner, I obtain accelerated closing of the shutters upon stoppage of the engine, but this accelerated closing is under control of the thermostat and does not occur until after the engine has cooled to a predetermined extent. In the event of the shutters being but partially open when the engine is stopped, whether or not the shutters will be moved immediately to completely closed position will be determined by the extent to which the thermostat is expanded. The accelerated closing of the shutters is thus always dependent upon and under the control of the thermostat.

In the form of my invention illustrated in Fig. 26, as well as in the other automatic forms thereof, if the engine is stopped at or below a predetermined cylinder temperature thereof, accelerated closing of the shutters will occur practically as soon as the engine stops. But if the engine stops at a cylinder temperature higher than such predetermined temperature, closing of the shutters will be retarded by the thermostat and the shutters will close gradually until the engine has cooled to the desired predetermined cylinder temperature, at which time the closing of the shutters will be accelerated. In all forms of my invention employing automatic control, the accelerated closing of the shutters is dependent upon the temperature of the cooling system and under the control of the thermostat, and at no time can the shutters close when the engine is at or near its maximum temperature for most efficient operation. This is advantageous as eliminating possibility of harmful overheating of the engine, due to residual heat, which is apt to occur when the shutters close immediately upon stoppage of the engine regardless of the temperature thereof and of the cooling system, as in the shutter operating systems of the prior art previously referred to.

In the modified form illustrated in Fig. 27, a shaft 76c is rockably mounted in brackets 160 suitably secured to the thermostat casing. Arms 75, carrying the roller 74 which bears upon disc 73, are secured to shaft 76c as before. The forward portion of this shaft is bent to provide depending arm 82 to the lower end of which is connected pull rod 84 in the same manner as in Fig. 9. The shutters are closed and opened in accordance with expansion and contraction of the thermostat, there being no accelerated closing of the shutters.

It is particularly pointed out that in the form of Fig. 27, the thermostat is disposed horizontally and with its lower wall in heat transfer relation to the adjacent wall of the radiator, the upper wall of this thermostat being subject to the temperature of the dead air space above the radiator. The lower wall of the thermostat is of considerable area and, due to the horizontal disposition thereof, the thermo-sensitive liquid within the thermostat is disposed in a thin layer or film upon such lower wall. This provides a large heat transfer area of contact between the thermostat and the thermo-sensitive liquid, as well as a large liberating area at the upper surface of the liquid layer or film. Consequently, a thermostat constructed and arranged in this manner is highly sensitive, and will respond much more quickly to variations in temperature than a thermostat constructed and arranged so that the thermo-sensitive liquid is disposed in a body of appreciable depth and relatively small area of contact with the thermostat walls, as is now the common practice.

A further advantage of disposing the thermostat as in Figure 27 is that the upper wall or portion thereof provides a heat transfer surface of considerable area, subject to the temperature of the air space above the radiator. This is advantageous in that it renders the thermostat more sensitive to variations in atmospheric temperature, the temperature which actuates the thermostat being a resultant between the temperature of the dead air space at the upper portion of the thermostat and the temperature imparted to the thermostat by heat derived from the radiator. I find that disposing the thermostat in the manner illustrated and described is highly advantageous in compensating for differences in atmospheric temperatures in the operation of the shutters.

The form illustrated in Figure 28 is in the nature of a variation of the form of Figures 8 and 9. Rod 84a is slidable through an eye 85b at the upper end of stud 85a which is secured to drag link 11 as before. An expansion coil spring 165, mounted about the outer end portion of rod 84a, is confined between eye 85b and a washer 166 held upon the rod in a suitable manner, as by means of a cotter pin 167. The thermostat comprises an upper flexible wall 168, the edge portion of which is turned upwardly and outwardly and seats in an annular groove formed in the top wall of tank 2c. A wire ring 169 is pressed into the edge portion of wall 168 and is soldered therein and to the tank wall. This secures wall 168 tightly in position and provides a fluid tight closure between this wall and the tank wall. The portion of the tank wall which underlies the wall 168 constitutes the other wall of the thermostat, and such underlying portion of the tank wall is preferably provided with closed transverse ribs 170 for imparting desired rigidity thereto. Preferably, wall 168 of the thermostat is provided with a plurality of concentric corrugations, in a known manner, and is capable of considerable vertical movement.

With the parts in the relative positions shown in Fig. 28, the shutters are fully opened and the ignition switch is closed, finger 104 being out of the path of movement of roller 105. The adjustment may be such that this condition obtains when the cooling system is at or below a predetermined temperature, for example, approximately 140° F. If now the ignition switch be opened, the shutters will close immediately, since arm 106 is free to move downwardly. On the other hand, if the cooling system be heated to a temperature appreciably above 140° F., as 160° F., the thermostat will move rod 84a so as to position finger 104 beneath roller 105, compressing spring 165. If the ignition switch be opened now, closing of the shutters will be delayed until the cooling system cools sufficiently to permit of movement of finger 104 from beneath roller 105, at which time accelerated closing of the shutters will occur. In this manner, I assure immediate closing of the shutters upon opening of the ignition switch, when the cooling system is at or below a predetermined low temperature, while obtaining delayed accelerated closing of the shutters when the cooling system is at or above a predetermined high temperature. By adjusting finger 104 on rod 84a the device can be set readily for operation in the manner stated and at the desired temperatures.

In the form of Figures 29 to 31, crank member 90 is provided, at its forward end, with an angularly disposed finger 90a of approximately L-shape. The rearward end of this finger is beveled upwardly and rearwardly, at 90b, for contact with a roller 175 mounted in the upper end of a bimetallic thermostat blade 176, of known type, secured by screws 177, or in any other suitable manner, to the front wall of tank 2c. Rod 88 is connected to the ignition switch rod in the same manner as in Figure 11, and finger 90a is disposed above roller 175 when the ignition switch is closed. Upon opening of the ignition switch, disc 100 is turned slightly in a clockwise direction, as viewed in Figure 12. This moves pin 101 a short distance beyond opening 103, and also turns crank 90 downwardly, thereby lowering arm 90a into position to contact roller 175. Thereafter the spring urges rods 88 and 92 in a clockwise direction, as viewed in Figure 12, and assures either immediate closing of the shutters, or accelerated closing thereof under control of the thermostat, depending upon the temperature of the cooling system of the engine. Conveniently, an adjusting screw 178 threads through the blade, above screws 177, and bears against the adjacent wall of the tank for adjusting the blade relative thereto. When the cooling system is at or below a predetermined low temperature, the roller 175 is disposed out of the path of movement of the beveled end of finger 90a, and the shutters will close immediately when crank member 90 is raised, incident to opening of the ignition switch. If the cooling system is at or above a predetermined high temperature, the roller 175 is disposed away from the front wall of the tank and beneath beveled end 90b of finger 90a. Under such conditions, crank 90 is held by roller 175 in its lowered position, and the shutters move slowly in closing direction as the thermostat 15a cools, incident to cooling off of the cooling system, until the temperature of the cooling system has been lowered to approximately the predetermined low temperature. At this time, roller 175 has been moved by thermostat blade 176 toward the front wall of tank 2c into position to release finger 90a, and the shutters are then immediately closed as before. The form of Figures 29 to 31 is quite similar in construction and operation to the form of Figures 8 and 9, except that the finger 104 of the latter form is replaced by the thermostat blade 176 and finger 90a and associated parts. In the form of Figures 29 to 31, as in the form of Figure 28, I assure immediate closing of the shutters upon opening of the ignition switch, when the cooling system is at or below a predetermined low temperature, and delayed accelerated closing of the shutters when the cooling system is at or above a predetermined high temperature. The blade 176 may be set readily, by means of screw 178, to determine the high and the low temperatures for controlling operation of the shutters in the manner above stated.

What I have said as to the advantages of disposing the thermostat horizontally as in Figure 27, applies equally well to all of the other forms of my invention in which the thermostat is so disposed. Also, it is not essential that the lower wall of the thermostat be in contact with or in heat conducting relation to a wall of the radiator, though this is preferable under certain conditions, since sufficient heat to assure satisfactory operation can be derived from the radiator, in many instances, by convection and radiation. In such cases, the thermostat may be spaced away from the radiator, as in Figure 23. Furthermore, it is not essential that a wafer type of thermostat be employed, though I prefer to use this type, particularly when disposed above the radiator, due to economy of space and because it possesses certain mechanical advantages of construction and operation. The disposition of the thermostat in a shielded area or dead air space is preferred, for reasons above pointed out, though this may not be essential in all cases. In its broader aspects, therefore, my invention comprehends the use of a thermostat of suitable type, containing a thermo-sensitive liquid and having a lower wall of appreciable area disposed horizontally and in heat transfer relation to an element of the engine cooling system, such thermostat being disposed in a dead air space or shielded area and having its upper wall or portion subject to the temperature of such space or area.

In Figures 2 and 10 I have indicated the thermo-sensitive liquid 1 as disposed in a thin layer or film upon the lower wall of the horizontally disposed thermostat, as occurs also in the thermostat of Figure 27 and the other forms of my invention in which the thermostat is disposed horizontally. In these two figures (2 and 10) the liquid is disposed in a thin layer upon the outer portion of the bottom wall as well as upon the depressed central portion of such wall. If this wall were flat or plane, as it may be if desired, the liquid would be disposed in a single continuous layer or film upon the upper surface of such wall. In Fig. 2 the spacer 20 is preferably provided with slots 20a disposed to permit entry of the thermo-sensitive liquid into the spacer and escape therefrom of the vapor incident to the vaporizing of such liquid.

By reference to Figures 17 and 20, it will be noted that, with the thermostat disposed vertically, the thermo-sensitive liquid 1' collects in a pool or body in the lower portion of the thermostat, this body of liquid being of appreciable depth and having relatively small area of contact with the surrounding walls of the thermostat, the upper or liberating surface of the body of liquid also being of small area. A thermostat disposed in this manner is sluggish in its operation, and does not respond quickly to variations in temperature. I avoid this objection, which is a real and frequently a serious one, by employing a thermostat having a bottom wall of considerable area disposed horizontally, so that the thermo-sensitive liquid is spread out in a thin layer or film upon this bottom wall, thus rendering it possible to obtain quick response to even slight variations in temperature and effective compensation for variations in atmospheric temperatures, as above set forth.

The form of thermostat illustrated in Figure 28 is highly sensitive, since the thermo-sensitive liquid is disposed in a thin layer or film directly upon the upper surface of the top wall of tank 2c. This form of thermostat is particularly advantageous in cases where it is essential, or desirable, that the thermostat respond quickly to slight changes in temperature of the cooling system. However, in this form, as in all other forms of my invention of the same general construction, the top wall of the thermostat provides a heat transfer surface of considerable area which is subject to the temperature of the dead air space within which the thermostat is disposed. Consequently, the thermostat does not respond directly to variations in temperature of the cooling system alone, but to a temperature which is the resultant between the temperature of the dead air space and the temperature of the cooling system.

In all of the forms of my invention disclosed I provide means whereby the operation of the shutters may be controlled in accordance with atmospheric temperature so that variations in atmospheric temperature are compensated for in the operation of the shutters. As above indicated, and as will be apparent to those skilled in the art, changes in construction and operation of parts of my invention may be resorted to without departing from the field and scope of the same, and I intend to include all such variations, as fall within the scope of the appended claims, in this application in which the preferred forms only of my invention are disclosed.

What I claim is:—

1. In an automobile, in combination with an internal combustion engine and a cooling system therefor including a radiator, shutters at one side of the radiator for regulating flow of air therethrough and yieldingly urged in closing direction, thermo-responsive means for opening the shutters, and means supplemental to the thermo-responsive means for optionally automatically accelerating closing of the shutters.

2. In an automobile, in combination with an internal combustion engine and a cooling system therefor including a radiator, shutters at one side of the radiator for regulating flow of air therethrough and yieldingly urged in closing direction, thermo-responsive means for opening the shutters, and means supplemental to the thermo-responsive means and operable in part independently thereof for optionally automatically accelerating closing of the shutters under control of the thermostat.

3. In an automobile, in combination with an internal combustion engine and a cooling system therefor including a radiator, shutters at one side of the radiator for regulating flow of air therethrough, means for opening and closing the shutters and including thermo-responsive means subject to the heat of the cooling system for opening the shutters, the shutters being under control of said thermo-responsive means during the opening and the closing movements of said shutters, and means for automatically accelerating closing of said shutters during a predetermined portion of the closing movement thereof.

4. In an automobile, in combination with an internal combustion engine and a cooling system therefor including a radiator, shutters at one side of the radiator for regulating flow of air therethrough, yielding means urging the shutters in closing direction, thermo-responsive means for opening the shutters and for controlling the closing thereof, said shutters normally being under the control of the thermo-responsive means during their opening and closing movements, and automatic means actuated by the shutters in the closing movement thereof for releasing the shutters from control of the thermo-responsive means and permitting immediate closing of said shutters by said yielding means, when the cooling system is at or below a predetermined temperature.

5. In an automobile, in combination with an internal combustion engine and a cooling system therefor including a radiator, shutters at one side of the radiator for regulating flow of air therethrough and yieldingly urged in closing direction, thermo-responsive means for opening the shutters, the shutters being under control of the thermo-responsive means in their opening and closing movements, and means actuated by the shutters in the closing movement thereof for automatically accelerating closing of the shutters, the last mentioned means being adjustable into and out of position to be actuated by the shutters.

6. In an automobile, in combination with an internal combustion engine and a cooling system therefor including a radiator, shutters at one side of the radiator for regulating flow of air therethrough and yieldingly urged in closing direction, a thermostat, a lever operatively connected to and actuated by the thermostat, operating connections between the lever and the shutters for opening and closing the latter under control of the thermostat, and optionally operative means for automatically releasing said shutters from control of the thermostat and permitting immediate closing of the shutters after they have been closed to a predetermined extent.

7. In an automobile, in combination with an internal combustion engine and a cooling system therefor including a radiator, shutters at one side of the radiator for regulating flow of air therethrough and yieldingly urged in closing direction, a thermostat, a lever having operating connection to and actuated by the thermostat, operating connections between the lever and the shutters for opening and closing the latter under control of the thermostat, and optionally operable means for automatically adjusting the lever relative to the thermostat and in a direction to accelerate closing of the shutters.

8. In an automobile, in combination with an internal combustion engine and a cooling system therefor including a passage for flow therethrough of a cooling fluid in contact with parts to be cooled, valve means for controlling flow of cooling fluid through said passage, and means for automatically opening the valve means and promptly closing the valve means when the engine is stopped at or below a predetermined temperature of the cooling system and for retarding closing of the valve means when the engine is stopped at a temperature of the cooling system above said predetermined temperature.

9. In an automobile, in combination with an internal combustion engine and a cooling system therefor including a passage for flow therethrough of a cooling fluid in contact with parts to be cooled, valve means for controlling flow of cooling fluid through said passage, and means for automatically opening the valve means and promptly closing the valve means when the engine is stopped at or below a predetermined temperature of the cooling system and for retarding closing of the valve means when the engine is stopped at a temperature of the cooling system above said predetermined temperature, said automatic means including cooperating members relatively adjustable to determine the temperature at which the valve means is promptly closed.

10. In an automobile, in combination with an internal combustion engine and a cooling system therefor including a radiator, shutters at one side of the radiator for regulating flow of air therethrough and yieldingly urged in closing direction, an expansible and collapsible thermostat for opening the shutters, means for limiting expansion of the thermostat, and means supplemental to the thermostat for automatically optionally accelerating closing of the shutters.

11. In an automobile, in combination with an internal combustion engine and a cooling system therefor including a radiator, shutters at one side of the radiator for regulating flow of air therethrough and yieldingly urged in closing direction, thermo-responsive means for opening the shutters and for controlling closing thereof, and means for optionally closing the shutters independently of the thermo-responsive means after the shutters have closed to a predetermined extent under control of said thermo-responsive means.

12. In an automobile, in combination with an internal combustion engine and a cooling system therefor including a radiator, shutters at one side of the radiator for regulating flow of air therethrough and yieldingly urged in closing direction, thermo-responsive means for opening the shutters and for controlling closing thereof, and automatic means for optionally closing the shutters independently of the thermo-responsive means after the shutters have closed to a predetermined extent under control of said thermo-responsive means.

13. In an automobile, in combination with an internal combustion engine and a cooling system therefor including a radiator, shutters at one side of the radiator for regulating flow of air therethrough and yieldingly urged in closing direction, thermo-responsive means for opening the shutters and for controlling closing thereof, and means for optionally releasing the shutters from control of the thermo-responsive means and permitting closing of said shutters when the cooling system is at or below a predetermined temperature.

14. In an automobile, in combination with an internal combustiion engine and a cooling system therefor including a radiator, shutters at one side of the radiator for regulating flow of air therethrough and yieldingly urged in closing direction, thermo-responsive means for opening the shutters and for controlling closing thereof, and means for optionally automatically releasing the shutters from control of the thermo-responsive means after the shutters have closed to a predetermined extent under control of said thermo-responsive means.

15. In an automobile, in combination with an internal combustion engine and a cooling system therefor including a radiator, shutters at one side of the radiator for regulating flow of air therethrough and yieldingly urged in closing direction, thermo-responsive means for opening the shutters and for controlling closing thereof, and means for releasing the shutters from control of the thermo-responsive means and permitting closing of said shutters when the cooling system is at or below a predetermined temperature.

16. In an automobile, in combination with an internal combustion engine and a cooling system therefor including a radiator, shutters at one side of the radiator for regulating flow of air therethrough and yieldingly urged in closing direction, thermo-responsive means for opening the shutters and for controlling closing thereof, an ignition switch, and means rendered operable by opening of the switch for releasing the shutters from control of the thermo-responsive means and permitting closing of said shutters when the cooling system is at or below a predetermined temperature.

17. In an automobile, in combination with an internal combustion engine and a cooling system therefor including a radiator, shutters at one side of the radiator for regulating flow of air therethrough and yieldingly urged in closing direction, a thermostat subject to the temperature of the cooling system, a plate pivoted for movement toward and away from the thermostat, a lever carried by the plate and actuated by the thermostat, operating connections between the lever and the shutters for opening the latter and controlling closing thereof by the thermostat, means for holding the plate against movement away from the thermostat, and means supplemental to said holding means and responsive to the temperature of the cooling system for releasing the holding means and thereby releasing said plate when the cooling system is at or below a predetermined low temperature.

18. In an automobile, in combination with an internal combustion engine and a cooling system therefor including a radiator, shutters at one side of the radiator for regulating flow of air therethrough and yieldingly urged in closing direction, a thermostat subject to the temperature of the cooling system, a plate pivoted for movement toward and away from the thermostat, a lever carried by the plate and actuated by the thermostat, operating connections between the lever and the shutters for opening the latter and controlling closing thereof by the thermostat, an ignition switch, and means rendered operable by opening of the switch for holding the plate against movement away from the thermostat when the cooling system is above a predetermined low temperature and for automatically releasing the plate when the cooling system is at or below said temperature.

19. In an automobile, in combination with an internal combustion engine and a cooling system therefor including a radiator, shutters at one side of the radiator for regulating flow of air therethrough and yieldingly urged in closing direction, a thermostat subject to the temperature of the cooling system, a plate pivoted for movement toward and away from the thermostat, a lever carried by the plate and actuated by the thermostat, operating connections between the lever and the shutters for opening the latter and controlling closing thereof by the thermostat, means controlled by operation of the engine for holding the plate against movement away from the thermostat when the engine is operating and for releasing the plate when the engine stops, and supplemental means for holding the plate against movement away from the thermostat when the cooling system is above a predetermined low temperature and for releasing the plate when the cooling system is at or below said temperature.

FRANK P. ILLSLEY.